United States Patent
Alexander et al.

(10) Patent No.: US 10,953,784 B2
(45) Date of Patent: Mar. 23, 2021

(54) VARIABLE FRICTION CARGO SURFACE SYSTEM FOR VEHICLES

(71) Applicants: GM GLOBAL TECHNOLOGY OPERATIONS LLC, Detroit, MI (US); The Regents of The University Of Michigan, Ann Arbor, MI (US)

(72) Inventors: Paul W. Alexander, Ypsilanti, MI (US); Wonhee M. Kim, Royal Oak, MI (US); Diann Brei, Milford, MI (US); Jonathan E. Luntz, Ann Arbor, MI (US); Koray Benli, Ann Arbor, MI (US); Laura Alejandra Giner Munoz, Ann Arbor, MI (US)

(73) Assignees: GM GLOBAL TECHNOLOGY OPERATIONS LLC, Detroit, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 138 days.

(21) Appl. No.: 16/178,040

(22) Filed: Nov. 1, 2018

(65) Prior Publication Data
US 2020/0139877 A1 May 7, 2020

(51) Int. Cl.
*B60P 7/08* (2006.01)
*B63B 25/24* (2006.01)

(52) U.S. Cl.
CPC ............ *B60P 7/0884* (2013.01); *B63B 25/24* (2013.01)

(58) Field of Classification Search
CPC ......... B60P 7/0884; B60P 1/02; B60P 7/0892; B60P 7/135; B63B 25/24; B62D 25/2054
USPC ...................... 410/94, 121; 296/39.2; 193/40
See application file for complete search history.

(56) References Cited

U.S. PATENT DOCUMENTS

| | | | | |
|---|---|---|---|---|
| 5,549,428 | A * | 8/1996 | Yeatts .................... | B60P 7/0892 410/121 |
| 6,746,199 | B2 * | 6/2004 | Carawan .................. | B60P 1/00 296/39.1 |
| 2007/0212184 | A1 * | 9/2007 | Borroni-Bird ........ | B60P 7/0884 410/94 |

* cited by examiner

*Primary Examiner* — Stephen T Gordon
(74) *Attorney, Agent, or Firm* — Lorenz & Kopf, LLP

(57) ABSTRACT

Cargo systems are provided for vehicles that include, in one embodiment: a variable cargo surface disposed within a body of the vehicle behind one or more occupant seats, the variable cargo surface including: a low friction surface that facilitates movement of cargo within the cargo system, the low friction surface having a first coefficient of friction; a high friction surface that inhibits movement of cargo within the cargo system, the high friction surface having a second coefficient of friction that is greater than the first coefficient of friction; and a control device that selectively activates the low friction surface and the high friction surface based on conditions for the vehicle; wherein the low friction surface contacts the cargo within the cargo system when the low friction surface is activated; and the high friction surface contacts the cargo within the cargo system when the high friction surface is activated.

11 Claims, 6 Drawing Sheets

VARIABLE FRICTION CARGO SURFACE SYSTEM FOR VEHICLES

TECHNICAL FIELD

The technical field generally relates to the field of vehicles and, more specifically, to cargo systems for vehicles.

Introduction

Many vehicles include cargo regions. However, it may be desirable to provide improved cargo regions, for example that further facilitate holding cargo in place and facilitating movement of cargo when desired.

Accordingly, it is desirable to provide cargo systems for vehicles, for example that further facilitate holding cargo in place and facilitating movement of cargo when desired.

Furthermore, other desirable features and characteristics of the present invention will become apparent from the subsequent detailed description and the appended claims, taken in conjunction with the accompanying drawings.

SUMMARY

A cargo system is provided for a vehicle. In one embodiment, the cargo system includes a surface that inhibits movement of cargo within the cargo system; and a control device that selectively activates and deactivates the surface based on conditions of the vehicle.

Also in one embodiment, the cargo system also includes a chamber coupled to the surface, the chamber configured to receive fluid for activating or deactivating the surface; and a fluid movement device configured to move fluid into or out of the chamber, to thereby activate or deactivate the surface.

Also in one embodiment, the cargo system also includes one or more channels coupled between the fluid movement device and the chamber for delivery of fluid therebetween; and the movement device includes a pump that is configured to: move fluid into the chamber for activation of the surface, when the surface is activated; and move fluid out of the chamber for de-activation of the surface, when the surface is activated.

Also in one embodiment, the cargo system also includes a sensor configured to receive sensor inputs regarding the conditions of the vehicle; and the control device includes a processor that is configured to determine a selected activation or deactivation of the surface based on the sensor inputs, and to provide instructions for the selected activation or deactivation of the surface.

Also in one embodiment, the surface includes a high friction surface having a second coefficient of friction; the cargo system further includes a low friction surface that facilitates movement of cargo within the cargo system, the low friction surface having a first coefficient of friction that is less than the second coefficient of friction; and the control device selectively activates the low friction surface and the high friction surface based on conditions of the vehicle.

Also in in one embodiment, the low friction surface contacts the cargo within the cargo system when the low friction surface is activated; and the high friction surface contacts the cargo within the cargo system when the high friction surface is activated.

Also in one embodiment, the cargo system further includes: a chamber coupled to the low friction surface or the high friction surface, the chamber configured to receive fluid for activating or deactivating the low friction surface or the high friction surface; and one or more channels coupled between the fluid movement device and the chamber for delivery of fluid therebetween and a fluid movement device configured to move fluid into or out of the chamber, via the one or more channels, to thereby activate or deactivate the low friction surface or the high friction surface.

Also in one embodiment, the cargo system further includes: a first chamber coupled to the low friction surface, the first chamber configured to receive fluid for activating the low friction surface; a second chamber coupled to the high friction surface, the second chamber configured to receive fluid for activating the high friction surface; one or more fluid movement devices configured to move fluid into and out of the first and second chambers, to thereby selectively activate and deactivate the low friction surface and the high friction surface; one or more first channels coupled between one or more of the fluid movement devices and the first chamber for delivery of fluid therebetween; and one or more second channels coupled between one or more of the fluid movement devices and the second chamber for delivery of fluid therebetween.

Also in one embodiment, the one or more fluid movement devices include a two-way pump that is configured to move fluid between the first chamber and the second chamber, to thereby selectively activate and deactivate the low friction surface and the high friction surface.

A method is provided. In one embodiment, the method includes: receiving sensor inputs from a sensor onboard a vehicle; and via a processor onboard the vehicle: selecting one of a low friction surface or a high friction surface of a cargo system for the vehicle for activation based on the sensor inputs; and providing instructions for the activation of the selected one of the low friction surface or the high friction surface; wherein: the low friction surface facilitates movement of cargo within the cargo system, with a first coefficient of friction; and the high friction surface inhibits movement of cargo within the cargo system, with a second coefficient of friction that is greater than the first coefficient of friction.

Also in one embodiment, the step of providing the instructions includes: providing instructions, via the processor, for one or more pumps onboard the vehicle to selectively provide fluid to a chamber associated with the selected one of the low friction surface or the high friction surface, to thereby activate the selected one of the low friction surface or the high friction surface and allow the selected one of the low friction surface or the high friction surface to contact cargo within the cargo system.

Also in one embodiment, the step of providing the instructions includes: providing instructions, via the processor, for one or more of the pumps onboard the vehicle to selectively provide fluid: out of the high pressure chamber and into the low pressure chamber, when activation of the low pressure chamber is desired; and out of the low pressure chamber and into the high pressure chamber, when activation of the high pressure chamber is desired.

A vehicle is provided. In one embodiment, the vehicle includes: a body; one or more occupant seats disposed within the body; and a cargo system including: a variable cargo surface disposed within the body of the vehicle behind one or more of the occupant seats, the variable cargo surface including: a low friction surface that facilitates movement of cargo within the cargo system, the low friction surface having a first coefficient of friction; a high friction surface that inhibits movement of cargo within the cargo system, the high friction surface having a second coefficient of friction that is greater than the first coefficient of friction; and a control device that selectively activates the low friction surface and the high friction surface based on conditions for the vehicle; wherein: the low friction surface contacts the cargo within the cargo system when the low friction surface is activated; and the high friction surface contacts the cargo within the cargo system when the high friction surface is activated.

Also in one embodiment, the vehicle further includes: a chamber coupled to the low friction surface or the high friction surface, the chamber configured to receive fluid for activating or deactivating the low friction surface or the high friction surface; a fluid movement device configured to move fluid into or out of the chamber, to thereby activate or deactivate the low friction surface or the high friction surface; and one or more channels coupled between the fluid movement device and the chamber for delivery of fluid therebetween.

Also in one embodiment, the chamber is coupled to the low friction surface; and the fluid movement device includes a pump that is configured to: move fluid into the chamber for activation of the low friction surface, such that the low friction surface extends above the high friction surface, such that the low friction surface contacts cargo in the vehicle when the low friction surface is activated; and move fluid out of the chamber for de-activation of the low friction surface, such that the low friction surface does not extend above the high friction surface, such that the high friction surface contacts the cargo in the cargo system when the low friction surface is activated.

Also in one embodiment, the vehicle further includes: a first chamber coupled to the low friction surface, the first chamber configured to receive fluid for activating the low friction surface; a second chamber coupled to the high friction surface, the second chamber configured to receive fluid for activating the high friction surface; one or more fluid movement devices configured to move fluid into and out of the first and second chambers, to thereby selectively activate and deactivate the low friction surface and the high friction surface; one or more first channels coupled between one or more of the fluid movement devices and the first chamber for delivery of fluid therebetween; and one or more second channels coupled between one or more of the fluid movement devices and the second chamber for delivery of fluid therebetween.

Also in one embodiment, the one or more fluid movement devices include a two-way pump that is configured to move fluid between the first chamber and the second chamber, to thereby selectively activate and deactivate the low friction surface and the high friction surface.

Also in one embodiment, the vehicle further includes: a sensor configured to receive sensor inputs regarding the conditions of the vehicle; wherein the control device includes a processor that is configured to determine a selected one of the low friction surface or the high friction surface for activation based on the sensor inputs, and to provide instructions for the activation of the selected one of the low friction surface or the high friction surface.

Also in one embodiment, the one or more occupant seats include one or more front occupant seats and one or more rear occupant seats; and the variable cargo surface is disposed in a rear cargo region behind the one or more rear occupant seats.

Also in one embodiment, the one or more occupant seats include one or more front occupant seats and one or more rear occupant seats; the one or more rear occupant seats have a front side, on which an occupant may sit when the one or more rear occupant seats are in a seating position, and a rear side, on which cargo may be stored when the one or more rear occupant seats are in a cargo position; and the variable cargo surface is disposed on the rear side of one or more of the rear occupant seats.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
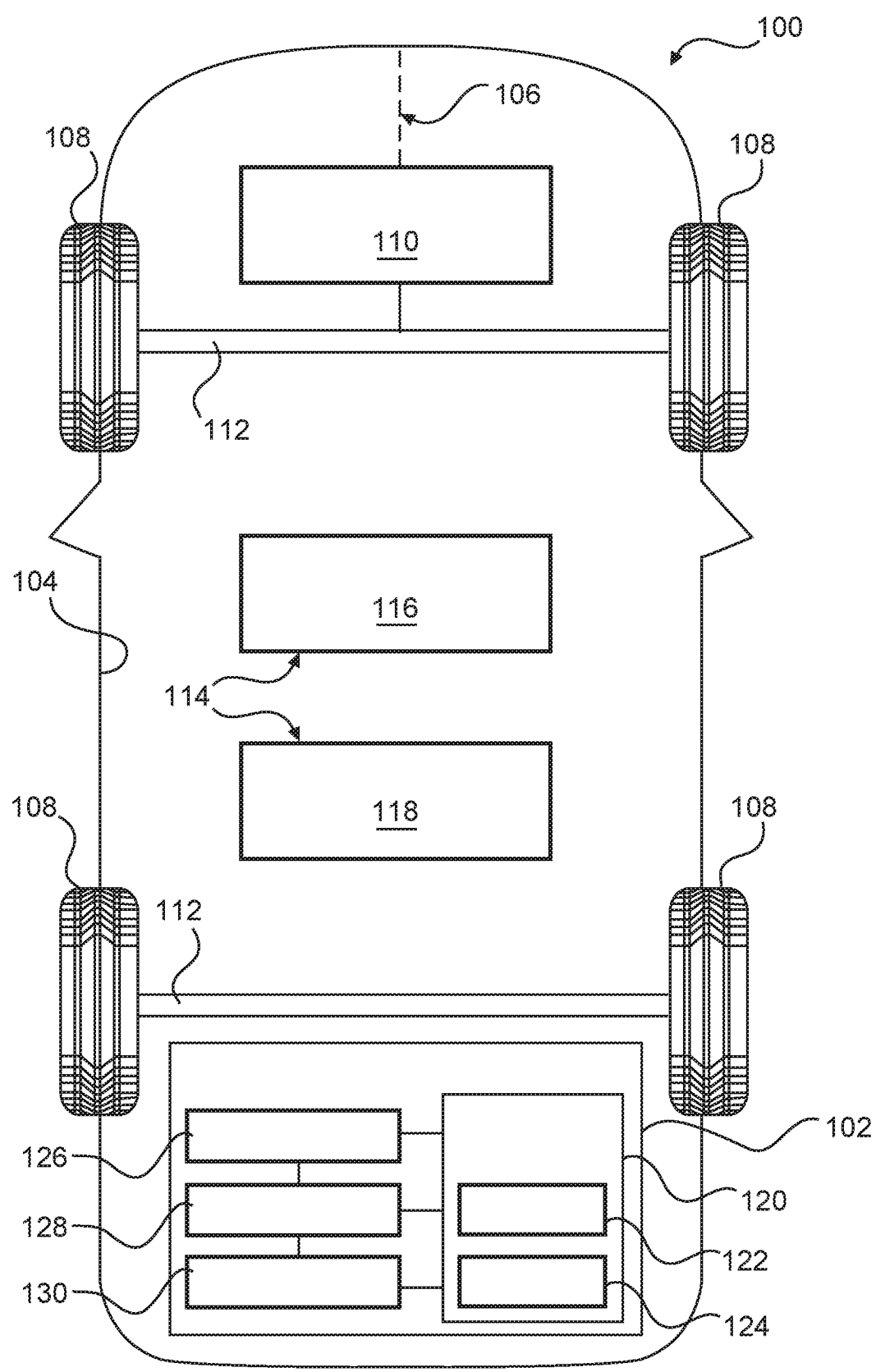
FIG. 1 is a functional block diagram of a vehicle, namely an automobile, that includes a cargo system with variable friction surfaces, for example that facilitates holding cargo in place and facilitating movement of cargo when desired, in accordance with exemplary embodiments.

FIG. 1 illustrates a vehicle 100 having a cargo system 102, in accordance with exemplary embodiments. As described in greater detail below, the cargo system 102 includes a plurality of friction surfaces 120, including a low friction surface 122 and a high friction surface 124.

As depicted in FIG. 1, in certain embodiments, the vehicle 100 comprises an automobile, such as a sport utility vehicle. It will be appreciated that the cargo system 102 described herein may be implemented in any number of different types of vehicles and/or platforms. For example, in various embodiments, the vehicle 100 may comprise any number of different types of automobiles (e.g., taxi cabs, vehicle fleets, buses, sedans, wagons, trucks, and other automobiles), other types of vehicles (e.g., marine vehicles, locomotives, aircraft, spacecraft, and other vehicles), and/or other mobile platforms, and/or components thereof.

In various embodiments, the vehicle 100 includes a body 104 that is arranged on a chassis 106. The body 104 substantially encloses other components of the vehicle 100. The body 104 and the chassis 106 may jointly form a frame. The vehicle 100 also includes a plurality of wheels 108. The wheels 108 are each rotationally coupled to the chassis 106 near a respective corner of the body 104 to facilitate movement of the vehicle 100. In one embodiment, the vehicle 100 includes four wheels 108, although this may vary in other embodiments (for example for trucks and certain other vehicles).

A drive system 110 is mounted on the chassis 106, and drives the wheels 108, for example via axles 112. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

Also as depicted in FIG. 1, in various embodiments the vehicle 100 includes occupant seats 114. In various embodiments, the vehicle 100 includes one or more front seats 116 and one or more rear seats 118. In various embodiments, the front seats 116 comprise one or more seating benches, bucket seats, and/or one or more other types of seating configurations for a front row of the vehicle 100, while the rear seats 118 comprise one or more seating benches, bucket seats, and/or one or more other types of seating configurations behind the front row. In certain embodiments, the rear seats 118 are foldable, rotatable, and/or otherwise movable between (i) a seating position, in which occupants may be seated on the rear seats 118; and (ii) a cargo position, in which cargo may be stored on the rear seats 118.

In the depicted embodiment, the cargo system 102 includes the above-referenced variable friction surfaces 120. In certain embodiments, the variable friction surfaces 120 are disposed in a rear cargo region, behind the rear seats 118, or in an exterior cargo area, such as a truck bed. In certain embodiments, the variable friction surfaces 120 are disposed as part of the rear seats 118, for example on a back side of the rear seats 118 (e.g., so that cargo may be stored on the friction surfaces 120 when the rear seats 118 are folded into the cargo position).

As noted above, in various embodiments, the variable friction surfaces 120 include a low friction surface 122 and a high friction surface 124. In various embodiments, the low friction surface 122 is made of a first material that facilitates movement of cargo within, and into and out of, the cargo system 102. Also in various embodiments, the high friction surface 124 is made of a second material that is different from the first material, and that inhibits movement of cargo within, and into and out of, the cargo system 102. Accordingly, in various embodiments, when the low friction surface 122 is activated, cargo may move relatively freely into and out of (and within) the cargo system 102. Conversely, also in various embodiments, when the high friction surface 124 is activated, cargo is inhibited from moving into and out of (and within) the cargo system 102.

In various embodiments, the cargo system 102 selectively activates the low friction surface 122 and the high friction surface 124 depending on whether free movement of cargo is desired. For example, when free movement of the cargo is desired (e.g., for loading and unloading the cargo into and from the vehicle 100), then the low friction surface 122 is activated in various embodiments. Conversely, when free movement of the cargo is not desired (e.g., after the cargo is loaded and/or while the vehicle 100 is moving), then the high friction surface 124 is activated in various embodiments.

As depicted in FIG. 1, in various embodiments, the cargo system 102 also includes one or more sensors 126, along with a computer system 128 and one or more fluid movement devices 130. In various embodiments, the sensors 126 receive inputs for use in determining whether activation of the low friction surface 122 or the high friction surface 124 is desired. For example, in various embodiments, the one or more sensors 126 may receive inputs as to whether a switch for the cargo system 102 has been activated, and/or whether one or more other conditions are satisfied that may impact whether activation of the low friction surface 122 or the high friction surface 124 is desired (e.g., by way of example, as to whether the vehicle 100 is parked, a gear and/or transmission status of the vehicle 100, whether a door or hatch of the vehicle 100 is open, whether the vehicle 100 is parked on an incline, and so on).

Figure 4:
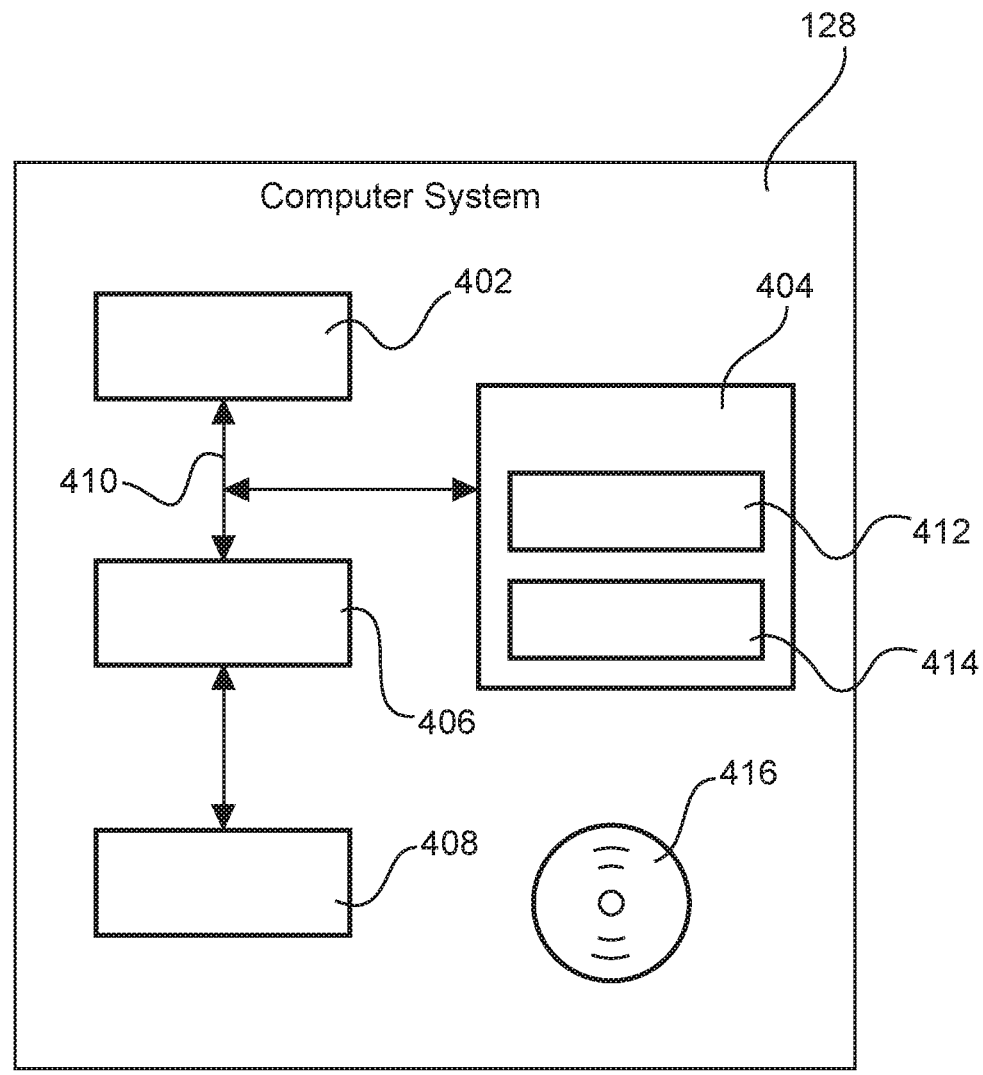
FIG. 4 provides a functional block diagram of a computer system of the cargo system of FIG. 1, in accordance with exemplary embodiments.

Also in certain embodiments, the computer system 128 may be used in determining whether the low friction surface 122 or the high friction surface 124 should be activated (e.g., based on the sensor data from the sensors 126), and for providing instructions for activating the selected surface. Also in various embodiments, the computer system 128 includes a processor 402 and other computer components as depicted in FIG. 4 and described further below in connection therewith.

Also in various embodiments, the fluid movement devices 130 are utilized in selectively activating the low friction surface 122 and the high friction surface 124. In certain embodiments, the fluid movement devices 130 comprise one or more pumps, vacuums, and/or other devices for movement of fluid (e.g., a gas or liquid), to thereby inflate and/or deflate respective chambers of the low friction surface 122 and/or high friction surface 124. In certain embodiments, one or more fluid movement devices 130 inflate the desired surface (i.e., one of the low friction surface 122 or high friction surface 124) that is desired for activation, and/or deflate the non-desired surface (i.e., the other of the low friction surface 122 or high friction surface 124) that is not desired for activation.

As described further below in connection herewith with respect to FIGS. 2 and 3, in certain embodiments, the fluid movement devices pump and/or or remove fluid (e.g., a gas and/or liquid) to, from, or between respective chambers of the low friction surface 122 and/or high friction surface 124 to achieve activation of the selected surface. In addition, as described further below in connection with FIGS. 4 and 5, in certain embodiments, the fluid movement devices 130 perform these functions via instructions provided by the computer system 128 (e.g., the processor 402 thereof of FIG. 4). For ease of reference, the fluid movement devices 130 may also referred to herein as "pumps"; however, it will be understood that such references to "pumps" may also include vacuums and/or other devices for moving fluid from one location to another, in various embodiments.

Figure 2:
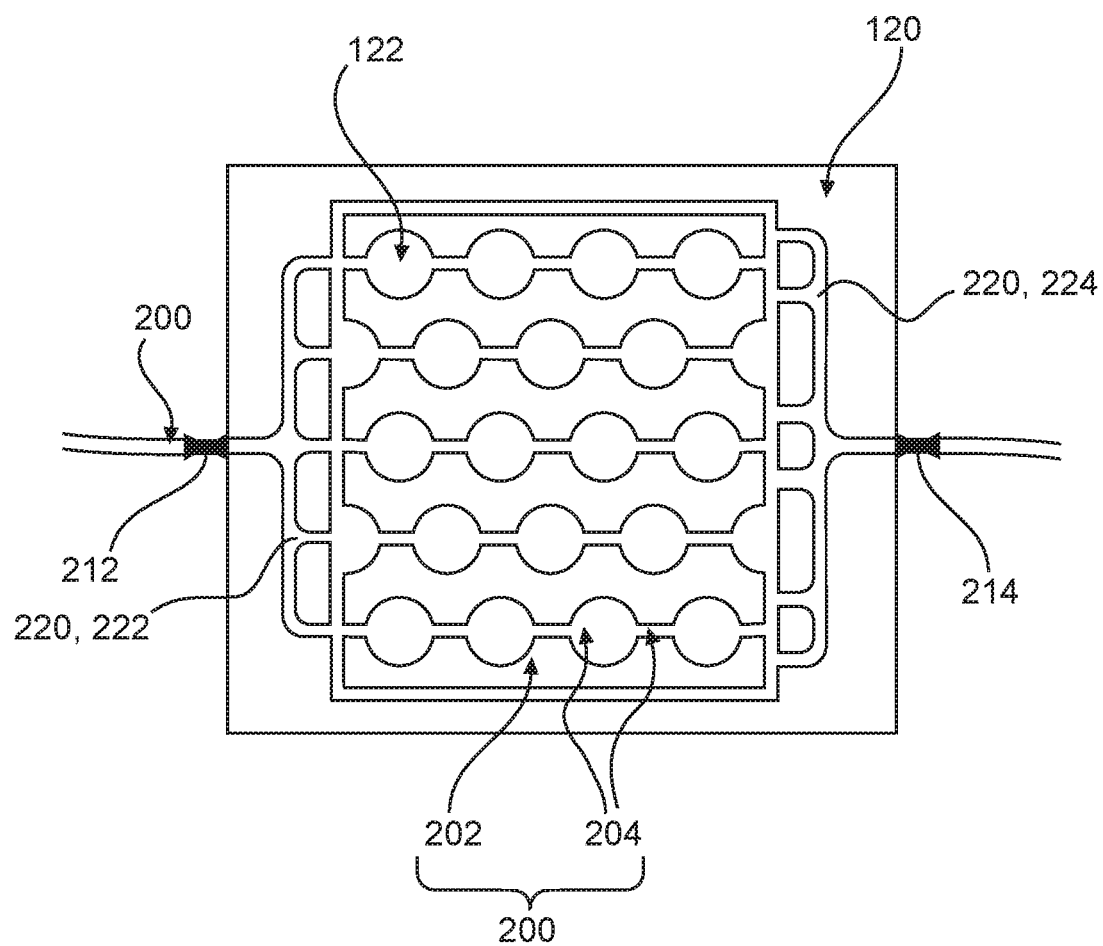
FIG. 2 provides an illustration of variable friction surfaces of the cargo system of FIG. 1, in accordance with exemplary embodiments.

FIG. 2 provides an illustration of variable friction surfaces 120 of the cargo system 102 of FIG. 1, including an exemplary low friction surface 122 and high friction surface 124, in accordance with exemplary embodiments. In various embodiments, the low friction surface 122 facilitates movement of cargo within the cargo system 102. Also in various embodiments, the high friction surface 124 inhibits movement of cargo within the cargo system 102.

In addition, in various embodiments, the low friction surface 122 has a first coefficient of friction, and the high friction surface 124 has a second coefficient of friction that is greater than the first coefficient of friction of the low friction surface 122. In various embodiments, the low friction surface 122 and the high friction surface 124 are made of different materials. For example, in certain embodiments, the low friction surface 122 comprises a rubber material, and the high friction surface 124 comprises a nylon material. However, this may vary in other embodiments.

In various embodiments, the low friction surface 122 and high friction surface 124 may include one or more patterns of different/varying material to facilitate or inhibit, respectively, movement of cargo in the cargo system 102. For example, in the example of FIG. 2, in certain embodiments, the low friction surface 122 may include a pattern with connected rows of shapes with circular top surfaces, with the high friction surface 124 filling in the regions in between. The specific patterns may vary in different embodiments. However, in various embodiments, the patterns (i) facilitate movement in multiple directions (e.g., front to back and side to side) when the low friction surface 122 is activated; and (ii) inhibit movement in multiple directions (e.g., front to back and side to side) when the high friction surface 124 is activated.

In the depicted embodiments, the variable friction surfaces 120 utilize an airtight bladder system in which one of the variable friction surfaces 120 is activated (e.g., raised above the other surface for contacting any cargo within the cargo system 102) at any particular time (e.g., via inflation of the surface and/or deflation of a different surface and/or respective chambers associated therewith), for example as described in additional detail further below. In various embodiments, the low friction surface 122 contacts the cargo within the cargo system 102 when the low friction surface 122 is activated. Conversely, also in various embodiments, the high friction surface 124 instead contacts the cargo within the cargo system 102 when the high friction surface 124 is activated.

As depicted in FIG. 2, in various embodiments, the variable friction surfaces 120 are coupled to one or more chambers 200. In various embodiments, each chamber 200 is configured to receive fluid or have fluid removed, for inflation nor deflation thereof, respectively, for activating or deceiving a respective one of the variable friction surfaces 120. Specifically, in certain embodiments depicted in FIG. 2, the low friction surface 122 is coupled to a first chamber 202, and the high friction surface 124 is coupled to a second chamber 204. Accordingly, in certain such embodiments, the first chamber 202 (i) receives fluid for inflation to elevate the low friction surface 122 when the low friction surface 122 is activated; and (ii) in certain embodiments has fluid removed for deflation to lower the low friction surface 122 when the high friction surface 124 is activated. Similarly, also in certain embodiments, the second chamber 204 (i) receives fluid for inflation to elevate the high friction surface 124 when the high friction surface 124 is activated; and (ii) in certain embodiments has fluid removed for deflation to lower the high friction surface 124 when the low friction surface 122 is activated.

In various embodiments, the type(s) of fluid used to inflate and/or deflate the chambers 200 may vary. For example, in certain embodiments, a gas (e.g., air) may be utilized for a pneumatic solution. In other embodiments, one or more liquids may be utilized.

In various embodiments, the low friction surface 122 is selected for contact with cargo in the cargo system 102 when movement of the cargo is to be facilitated, for example when cargo may be loaded into and/or unloaded from the cargo system 102 (e.g., when the vehicle 100 is parked). In certain embodiments, the low friction surface 122 serves as a "default" surface, for example for when the vehicle 100 is not in operation. In certain embodiments, the low friction surface 122, when selected in this manner, is effectively elevated over the high friction surface 124 via inflation of the first chamber 202, to thereby contact the cargo. In certain embodiments, the low friction surface 122 may be selected via deflation of the second chamber 204, instead of or in addition to the inflation of the first chamber 202. In addition, in certain embodiments, the low friction surface 122 may be stationary, and set as a "default" service that is above the high friction surface 124 (e.g., so that the low friction surface 122 is activated by default, until the high friction surface 124 is activated).

Conversely, also in various embodiments, the high friction surface 124 is selected for contact with cargo in the cargo system 102 when movement of the cargo is to be inhibited, for example when cargo may be stored in place within the cargo system 102 (e.g., when the vehicle 100 is in operation or moving). In certain embodiments, the high friction surface 124, when selected in this manner, is effectively elevated over the low friction surface 122 via inflation of the second chamber 204, to thereby contact the cargo. In certain embodiments, the high friction surface 124 may be selected via deflation of the first chamber 202, instead of or in addition to the inflation of the second chamber 204.

Also as depicted in FIG. 2, in various embodiments the variable friction surfaces 120 include and/or are coupled with one or more ports 210 and channels 220. In various embodiments, respective ports 210 and channels 220 are coupled (e.g., connected) to one another, and between the fluid movement devices 130 of FIG. 1 (e.g., a pump and/or vacuum, in certain embodiments) and respective chambers 200, to facilitate fluid flow therebetween. For example, as depicted in FIG. 2, in certain embodiments, a first port 212 and a first channel 222 are coupled between one or more fluid movement devices 130 (not depicted in FIG. 2) and the first chamber 202 to facilitate fluid flow therebetween, whereas a second port 214 and a second channel 224 are coupled between one or more fluid movement devices 130 and the second chamber 204 to facilitate fluid flow therebetween.

In certain embodiments, one or more control devices (such as the computer system 128 of FIG. 1, including the processor 402 thereof described further below in connection with FIG. 4) selectively activate the low friction surface 122 or the high friction surface 124 at any particular point in time by providing instructions for the one or more fluid movement devices 130 to selectively move fluid into or out of the first chamber 202 or the second chamber 204 (e.g., via the first or second port 212, 214, respectively and the first or second channels 222, 224, respectively), and/or between the first and second chambers 202, 204 (e.g., via channels 222, 224).

Accordingly, in certain embodiments, when the low friction surface 122 is activated, one or more fluid movement devices 130 of FIG. 1 (e.g., via instructions from the computer system 128) moves fluid into the first chamber 202 for inflation thereof via the first port 212 and the first channel 222. As a result, the low friction surface 122 extends above the high friction surface 124, such that the low friction surface 122 contacts cargo in the cargo system 102 when the low friction surface 122 is activated. In certain embodiments, this is accomplished by the fluid movement devices 130 (e.g., via instructions from the computer system 128) moving fluid out of the second chamber 204 for deflation thereof, with a similar end result of the low friction surface 122 extending above the high friction surface 124, such that the low friction surface 122 contacts cargo in the cargo system 102. In addition, in certain embodiments, the inflation of the first chamber 202 and the deflation of the second chamber 204 may be performed together when the low friction surface 122 is activated.

Conversely, also in certain embodiments, when the high friction surface 124 is activated, one or more fluid movement devices 130 of FIG. 1 (e.g., via instructions from the computer system 128) moves fluid into the second chamber 204 for inflation thereof via the second port 214 and the second channel 224. As a result, the high friction surface 124 extends above the low friction surface 122, such that the high friction surface 124 contacts cargo in the cargo system 102 when the high friction surface 124 is activated. In certain embodiments, this is accomplished by the fluid movement devices 130 (e.g., via instructions from the computer system 128) moving fluid out of the first chamber 204 for deflation thereof, with a similar end result of the high friction surface 124 extending above the low friction surface 122, such that the high friction surface 124 contacts cargo in the cargo system 102. In addition, in certain embodiments, the inflation of the second chamber 204 and the deflation of the first chamber 202 may be performed together when the high friction surface 124 is activated.

In certain embodiments, a single fluid movement device 130 (e.g., a two-way pump) may be used for inflation and deflation of the first and second chambers 202, 204. In one such embodiment, the fluid movement device 130 comprises a two-way pump that moves fluid between the first and second chambers 202, 204. In certain other embodiments, the fluid movement device(s) 130 may move fluid between the chambers 202, 204 and one or more accumulators. Also in certain other embodiments, different fluid movement devices 130 (e.g., different pumps and vacuums) may be used for inflating versus deflating the chambers 202, 204, and/or different fluid movement devices 130 may similarly be used for different respective chambers 202, 204.

Figure 3:
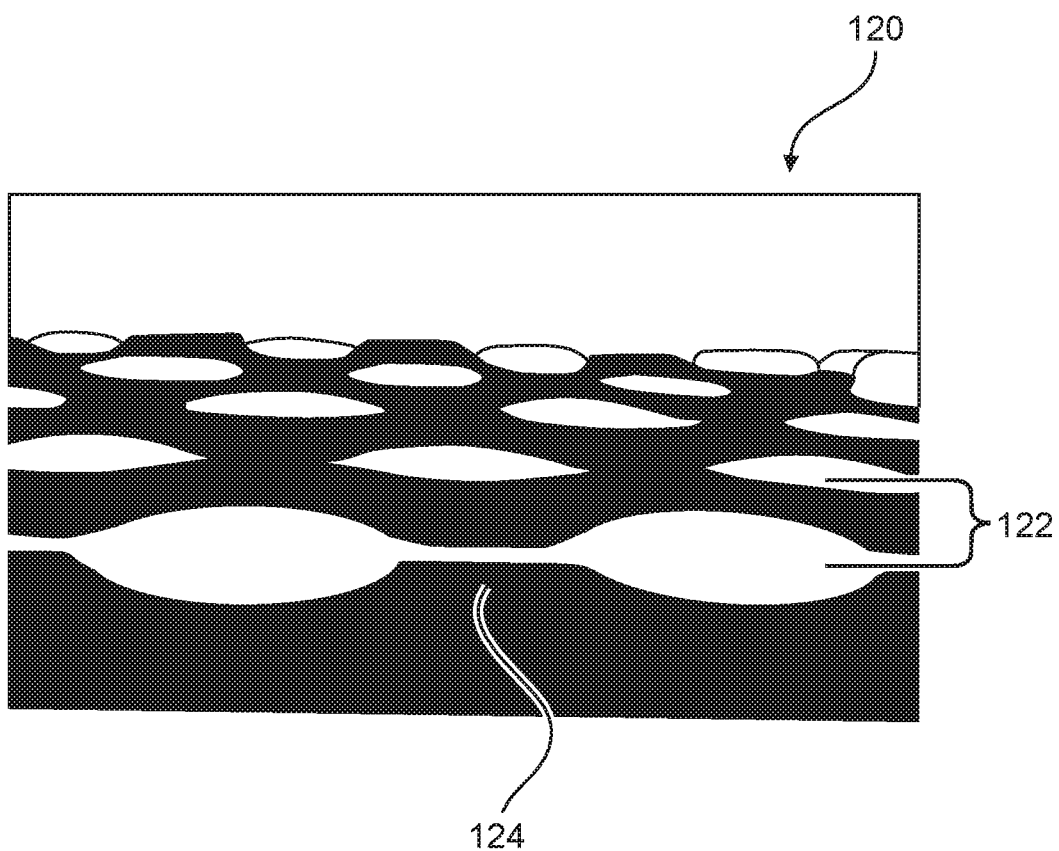
FIG. 3 provides an exploded view of the variable friction surfaces of FIG. 2, shown with a high friction surface activated, in accordance with exemplary embodiments.

FIG. 3 provides a close-up illustration of the variable friction surfaces 120 of FIG. 2, in accordance with exemplary embodiments. Specifically, FIG. 3 depicts a closer view of a portion of the low friction surface 122 and high friction surface 124. In FIG. 3, the high friction surface 124 is depicted in an activated state. Accordingly, in this state, the high friction surface 124 extends above the low friction surface 122, and would therefore contact cargo in the cargo system 102, to thereby inhibit movement of the cargo (e.g., while the vehicle 100 is in operation and/or moving).

FIG. 4 provides a functional block diagram of the computer system 128 of the cargo system 102 of FIG. 1, in accordance with exemplary embodiments. As depicted in FIG. 4, in various embodiments, the computer system 128 (or controller) of the cargo system 102 includes a processor 402, a memory 404, an interface 406, a storage device 408, and a bus 410. The processor 402 performs the computation and control functions of the computer system 128, and may comprise any type of processor or multiple processors, single integrated circuits such as a microprocessor, or any suitable number of integrated circuit devices and/or circuit boards working in cooperation to accomplish the functions of a processing unit. During operation, the processor 402 executes one or more programs 412 contained within the memory 404 and, as such, controls the general operation of the computer system 128, generally in executing the processes described herein, such as the process 600 described further below in connection with FIG. 6. The control system may also be included within a larger control module within the vehicle responsible for multiple functions.

The memory 404 can be any type of suitable memory. For example, the memory 404 may include various types of dynamic random access memory (DRAM) such as SDRAM, the various types of static RAM (SRAM), and the various types of non-volatile memory (PROM, EPROM, and flash). In certain examples, the memory 404 is located on and/or co-located on the same computer chip as the processor 402. In the depicted embodiment, the memory 404 stores the above-referenced program 412 along with one or more stored values 414.

The bus 410 serves to transmit programs, data, status and other information or signals between the various components of the computer system 128. The interface 406 allows communication to the computer system 128, for example from a system driver and/or another computer system, and can be implemented using any suitable method and apparatus. In one embodiment, the interface 406 obtains the various data from the sensors 126 and/or the drive system 110 of FIG. 1. The interface 406 can include one or more network interfaces to communicate with other systems or components. The interface 406 may also include one or more network interfaces to communicate with technicians, and/or one or more storage interfaces to connect to storage apparatuses, such as the storage device 408.

The storage device 408 can be any suitable type of storage apparatus, including direct access storage devices such as hard disk drives, flash systems, floppy disk drives and optical disk drives. In one exemplary embodiment, the storage device 408 comprises a program product from which memory 404 can receive a program 412 that executes one or more embodiments of one or more processes of the present disclosure, such as the steps of the process 600 (and any sub-processes thereof) described further below in connection with FIG. 6. In another exemplary embodiment, the program product may be directly stored in and/or otherwise accessed by the memory 404 and/or a disk (e.g., disk 416), such as that referenced below.

The bus 410 can be any suitable physical or logical means of connecting computer systems and components. This includes, but is not limited to, direct hard-wired connections, fiber optics, infrared and wireless bus technologies. During operation, the program 412 is stored in the memory 404 and executed by the processor 402.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 402) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system 128 may also otherwise differ from the embodiment depicted in FIG. 4, for example in that the computer system 128 may be coupled to or may otherwise utilize one or more remote computer systems and/or other control systems.

Figure 5:
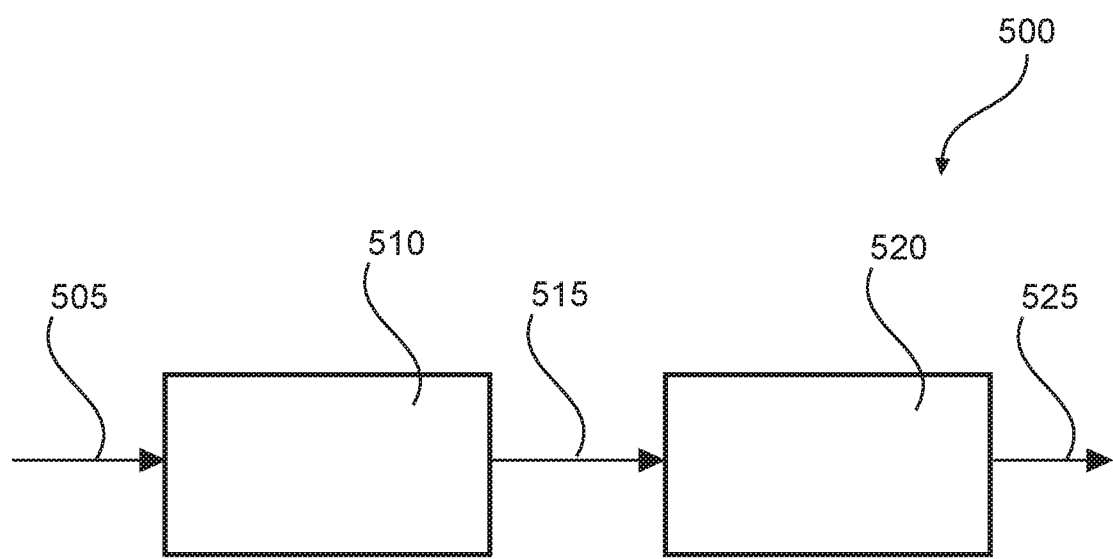
FIG. 5 depicts a functional block diagram of a control system of the cargo system of FIG. 1, and that can be implemented in connection with the computer system of FIG. 4, in accordance with exemplary embodiments.

FIG. 5 depicts a functional block diagram of a control system 500 of the cargo system 102 of FIG. 1, and that can be implemented in connection with the computer system 128 of FIG. 4, in accordance with exemplary embodiments. Specifically, as depicted in FIG. 5, and with continued reference to FIGS. 1 and 4, in certain embodiments, a control system 500 for the cargo system 102 of FIG. 1 generally includes an input module 510 and a processing module 520. In various embodiments, both the input module 510 and the processing module 520 are disposed onboard the vehicle 100. In certain embodiments, one or both of the input module 510 and/or processing module 520, and/or components thereof, may be disposed remote from the vehicle 100 (e.g., on a remote server that communicates with the vehicle 100). As can be appreciated, in various embodiments, parts of the control system 500 may be disposed on a system remote from the vehicle 100 while other parts of the control system 500 may be disposed on the vehicle 100.

In various embodiments, the input module 510 obtains data from various sensors and/or other systems of the vehicle 100. For example, in certain embodiments, the input module 510 obtains sensor data from one or more sensors 126 and/or the drive system 110 of FIG. 1 with respect to circumstances as to whether the low friction surface 122 or the high friction surface 124 is desired for the cargo system 102 (e.g., by way of example, as to whether the vehicle 100 is parked, a gear and/or transmission status of the vehicle 100, whether a door or hatch of the vehicle 100 is open, whether the vehicle 100 is parked on an incline, and so on).

In various embodiments, the processing module 520 receives the data as inputs 515, and processes the data. In various embodiments, the processing module 520 processes sensor data from the input module 510, determines whether the low friction surface 122 or the high friction surface 124 is desired based on the processing, and provides instructions for the activation of the desired surface. In various embodiments, the processing module 520 provides outputs 525 for the activation of the selected surface (e.g., instructions for the pump 130 to move fluid into, out of, or between one or more of the surfaces accordingly, to attain the activation of the desired surface), for example as described greater below in connection with the process 600 of FIG. 6.

Figure 6:
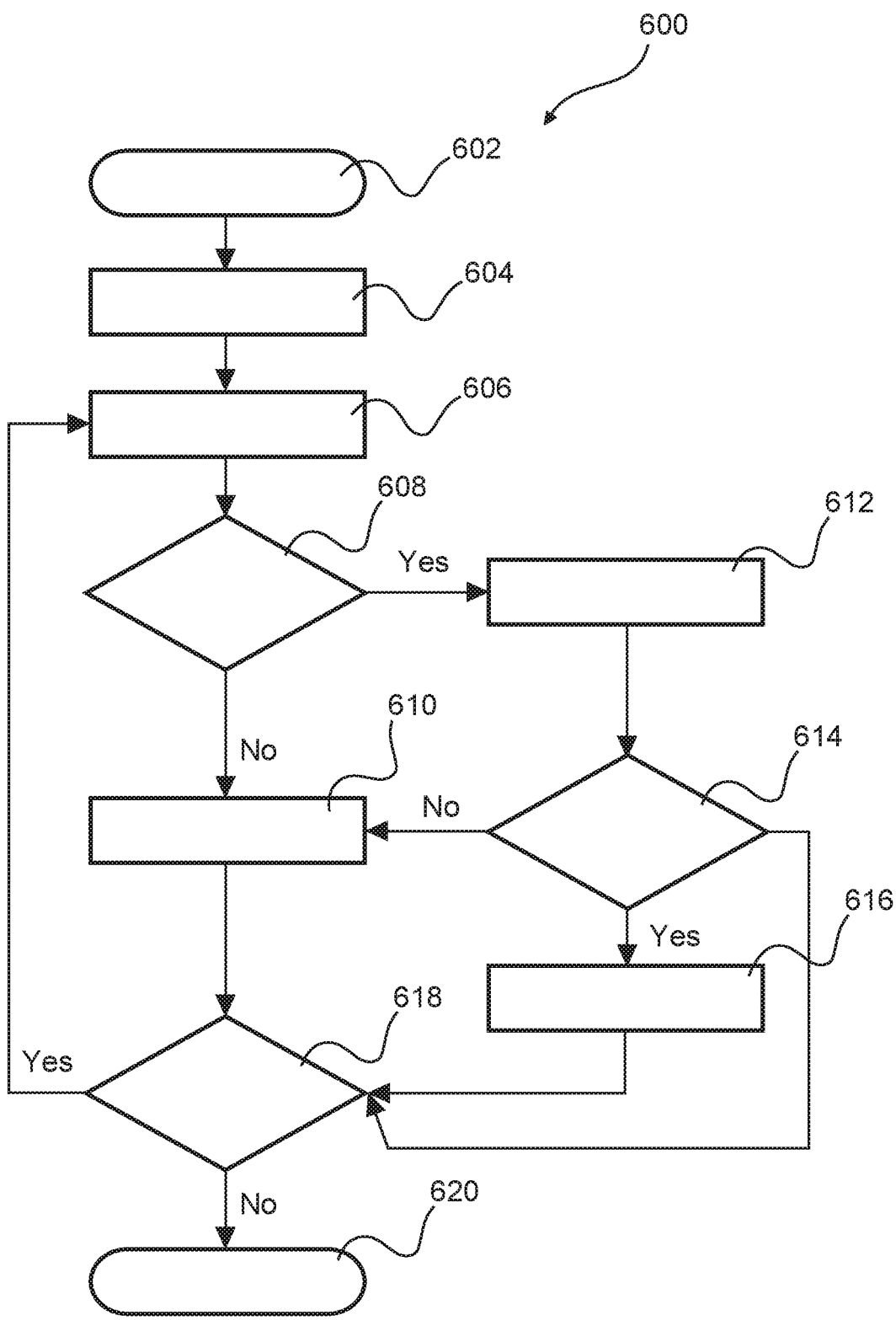
FIG. 6 depicts a flowchart of a process for controlling a cargo system of a vehicle, and that can be implemented in connection with the vehicle and cargo system of FIG. 2, the variable friction surfaces of FIGS. 2 and 3 the computer system of FIG. 4, and the control system of FIG. 5, in accordance with exemplary embodiments.

FIG. 6 depicts a flowchart of a process 600 for controlling a cargo system 102 of a vehicle. In various embodiments, the process 600 can be implemented in connection with the vehicle 100 and cargo system 102 of FIG. 2, the variable friction surfaces 120 of FIGS. 2 and 2, the computer system 128 of FIG. 4, and the control system 500 of FIG. 5, in accordance with exemplary embodiments.

As depicted in FIG. 6, the process begins at 602. In one embodiment, the process 600 begins when a vehicle drive or ignition cycle begins, for example when a driver approaches or enters the vehicle 100, or when the driver or occupant approaches the vehicle and/or turns on the vehicle and/or an ignition therefor (e.g. by turning a key, engaging a keyfob or start button, and so on). In one embodiment, the steps of the process 600 are performed continuously during operation of the vehicle.

In various embodiments, the cargo system 102 has a default surface activated (in addition to an activated state, there could also be a default, statically 'deployed' state, i.e. the high friction surface is just nominally taller than the low friction surface) at 604. In certain embodiments, the low friction surface 122 is activated as the default surface when the process 600 begins. In certain embodiments, the first chamber 202 of FIG. 2 is inflated at 604, so that the low friction surface 122 extends above the high friction surface 124. In certain other embodiments, the low friction surface 122 may comprise a static component that is deployed in the cargo system 102 at a height that is above the high friction surface 124. In such embodiments, the low friction surface 122 extends above the high friction surface 124 to contact cargo in the cargo system 102. In certain embodiments, the default surface is activated when the vehicle 100 is not in operation and is not moving. In certain embodiments, the default surface may vary.

Also in various embodiments, inputs are received at 606. In certain embodiments, sensor data is obtained from the sensors 126 of FIG. 1 (e.g., via the input module 510 of FIG. 5). Also in certain embodiments, the sensor data comprises data as to whether a switch for the cargo system 102 has been activated, whether the vehicle 100 is parked, a gear and/or transmission status of the vehicle 100, whether a door or hatch of the vehicle 100 is open, whether the vehicle 100 is parked on an incline, whether cargo loads are being applied to the system surface(s), and/or data pertaining to whether one or more other conditions are satisfied that may impact whether activation of the low friction surface 122 or the high friction surface 124 is desired.

Also in certain embodiments, a determination is made at 608 as to whether a change in the activated surface is desired, based on the inputs. For example, in certain embodiments, a change to activate the high friction surface 124 may be desired when a switch to activate the high friction surface 124 is engaged, and/or when the vehicle 100 is moving, a rear hatch or other door of the vehicle 100 is closed, an ignition for the vehicle 100 has been turned on, and/or the vehicle 100 is otherwise ready for movement (e.g., such that it may be desired to keep the cargo in place within the cargo system 102 while the vehicle is moving), and/or when the vehicle 100 is parked at a steep angle (e.g., such that it may be desired for the cargo not to slide out too quickly). In certain embodiments, such a determination of 608 may be made by one or more processors, such as the processor 402 of FIG. 4 (e.g., via the processing module 520 of FIG. 5).

If a change in the activated surface is not desired, then, at 610, the currently activated surface remains the same. For example, in certain embodiments, during an initial iteration of 610, the low friction surface 122 remains activated as the default surface during 610. Also in various embodiments, the process proceeds to 618, described further below.

Conversely, if a change in the activated surface is desired, then a change in the activated surface is implemented at 612 in various embodiments. For example, in certain embodiments, the processor 402 of FIG. 4 (e.g., via the processing module 520 of FIG. 5) provides instructions for one or more fluid movement devices 130 (e.g., one or more pumps) to selectively inflate or deflate one or more appropriate chambers 200 to thereby activate the desired surface, for example as described in greater detail with various examples above with respect to FIG. 2. For example, in certain embodiments, when the high friction surface 124 is selected for activation, fluid is provided to inflate the second chamber 204, and/or fluid is removed from the first chamber 202, to thereby effectively have the high friction surface 124 elevated with respect to the low friction surface 122 to contact the cargo in the cargo system 102.

In certain embodiments, the activation of the desired surface at 612 may be performed without any processor, and without any specific determinations of 608. For example, in certain embodiments, the fluid movement device(s) 130 (e.g., a pump) may be mechanically or otherwise coupled to the sensors 126 for automatic activation of the desired surface, without requiring a processor, when a switch is engaged by a user or vehicle device. Also in certain embodiments, the fluid movement device(s) 130 (e.g., a pump) may also be connected or otherwise coupled to one or more vehicle devices for activation when a condition exists (e.g., via coupling to a rear hatch, such that the pump moves air into or out of the desired chamber when the rear hatch is opened or closed), and so on in various embodiments.

In various embodiments, a determination is also made at 614 as to whether another change in the activated surface is desired. In certain embodiments, inputs from 606 are continuously obtained, and further determinations are continuously made in iterations of 614 as to whether a further change exists for the desired surface for activation. For example, in certain embodiments, if a change in surface was made in 612 as a result of the vehicle 100 being driven, and the vehicle 100 is subsequently parked, then another change in the activated surface may be warranted based on the vehicle 100 now being parked, and so on. In various embodiments, the determinations of 614 are similar to those of 608, described above.

If a further change in the activated surface is desired, then such a further change in the activated surface is implemented at 616. In various embodiments, the activation of 616 is similar to that of 612, but with respect to a different activated surface. For example, in certain embodiments, if the high friction surface 124 was activated in a most recent iteration of 612 and a further change is subsequently desired, then the low friction surfaced 112 may be activated in a current iteration of 614, and soon. Conversely, if a further change in the activated surface is not desired, then in various embodiments the process proceeds instead to step 610, as the activated surface remains the same. In various embodiments, in either case, the process then proceeds to 618, described below.

In various embodiments, a determination is made at 618 at to whether the process is to continue. For example, in certain embodiments, during 618, a processor determines whether the vehicle 100 is still in operation, and/or whether a user is still in proximity to the vehicle 100. In certain embodiments, if the process is to continue, then the process returns to 606 in a new iteration. Otherwise, in various embodiments, the process terminates at 620.

Accordingly, the systems and vehicles described herein provide for cargo systems for vehicles, with the cargo systems utilizing variable friction surfaces. In various embodiments, a low friction surface is activated when appropriate (e.g., when the vehicle is parked) to facilitate movement of cargo in and out of the cargo system. Conversely, also in various embodiments, a high friction surface is activated when appropriate (e.g., when the vehicle is moving) to restrict movement of cargo within the cargo system.

It will be appreciated that the systems and vehicles (and components thereof) may vary from those depicted in the figures and described herein. It will similarly be appreciated that the cargo system, and components and implementations thereof, may be installed in any number of different types of platforms (including those discussed above), and vary from that depicted in FIGS. 1-5 and described in connection therewith, in various embodiments. It will also be appreciated that the processes (and/or subprocesses) disclosed herein may differ from those described herein and/or depicted in FIG. 6, and/or that steps thereof may be performed simultaneously and/or in a different order as described herein and/or depicted in FIG. 6, among other possible variations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A cargo system for a vehicle, the cargo system comprising:
    a variable cargo surface configured to be disposed within a body of the vehicle, the variable cargo surface comprising:
        a low friction surface that facilitates movement of cargo within the cargo system, the low friction surface having a first coefficient of friction; and
        a high friction surface that inhibits movement of the cargo within the cargo system, the high friction surface having a second coefficient of friction that is greater than the first coefficient of friction;
    a control device that selectively activates and deactivates the low friction surface and the high friction surface based on conditions of the vehicle, wherein:
        the low friction surface contacts the cargo within the cargo system when the low friction surface is activated; and
        the high friction surface contacts the cargo within the cargo system when the high friction surface is activated;
    a first chamber coupled to the low friction surface, the first chamber configured to receive fluid for activating the low friction surface;
    a second chamber coupled to the high friction surface, the second chamber configured to receive fluid for activating the high friction surface;
    one or more fluid movement devices configured to move fluid into and out of the first and second chambers, to thereby selectively activate and deactivate the low friction surface and the high friction surface;
    one or more first channels coupled between one or more of the one or more fluid movement devices and the first chamber for delivery of fluid therebetween; and
    one or more second channels coupled between one or more of the one or more fluid movement devices and the second chamber for delivery of fluid therebetween.

2. The cargo system of claim 1,
    wherein the one or more fluid movement devices comprise a pump that is configured to:
        move fluid into the first chamber for activation of the low friction surface, when the low friction surface is activated;
        move fluid into the second chamber for activation of the high friction surface, when the low friction surface is activated;
        move fluid out of the first chamber for de-activation of the low friction surface, when the low friction surface is activated; and move fluid out of the second chamber for de-activation of the high friction surface, when the high friction surface is activated.

3. The cargo system of claim 1, further comprising:
a sensor configured to receive sensor inputs regarding the conditions of the vehicle;
wherein the control device comprises a processor that is configured to determine a selected activation or deactivation of the low friction surface and the high friction surface based on the sensor inputs, and to provide instructions for the selected activation or deactivation of the low friction surface and the high friction surface.

4. The cargo system of claim 1, wherein the one or more fluid movement devices comprise a two-way pump that is configured to move fluid between the first chamber and the second chamber, to thereby selectively activate and deactivate the low friction surface and the high friction surface.

5. A vehicle comprising:
a body; and
a cargo system comprising:
a variable cargo surface disposed within the body of the vehicle, the variable cargo surface comprising:
a low friction surface that facilitates movement of cargo within the cargo system, the low friction surface having a first coefficient of friction; and
a high friction surface that inhibits movement of cargo within the cargo system, the high friction surface having a second coefficient of friction that is greater than the first coefficient of friction;
a control device that selectively activates the low friction surface and the high friction surface based on conditions for the vehicle; wherein:
the low friction surface contacts the cargo within the cargo system when the low friction surface is activated; and
the high friction surface contacts the cargo within the cargo system when the high friction surface is activate;
a first chamber coupled to the low friction surface, the first chamber configured to receive fluid for activating the low friction surface;
a second chamber coupled to the high friction surface, the second chamber configured to receive fluid for activating the high friction surface;
one or more fluid movement devices configured to move fluid into and out of the first and second chambers, to thereby selectively activate and deactivate the low friction surface and the high friction surface;
one or more first channels coupled between one or more of the one or more fluid movement devices and the first chamber for delivery of fluid therebetween; and
one or more second channels coupled between one or more of the one or more fluid movement devices and the second chamber for delivery of fluid therebetween.

6. The vehicle of claim 5, wherein:
the one or more fluid movement devices comprise a pump that is configured to:
move fluid into the first chamber for activation of the low friction surface, such that the low friction surface extends above the high friction surface, such that the low friction surface contacts cargo in the vehicle when the low friction surface is activated; and
move fluid out of the first chamber for de-activation of the low friction surface, such that the low friction surface does not extend above the high friction surface, such that the high friction surface contacts the cargo in the cargo system when the high friction surface is activated.

7. The vehicle of claim 5, wherein the one or more fluid movement devices comprise a two-way pump that is configured to move fluid between the first chamber and the second chamber, to thereby selectively activate and deactivate the low friction surface and the high friction surface.

8. The vehicle of claim 5, further comprising:
a sensor configured to receive sensor inputs regarding the conditions of the vehicle;
wherein the control device comprises a processor that is configured to determine a selected one of the low friction surface or the high friction surface for activation based on the sensor inputs, and to provide instructions for the activation of the selected one of the low friction surface or the high friction surface.

9. The vehicle of claim 5, wherein:
the vehicle includes one or more occupant seats comprising one or more front occupant seats and one or more rear occupant seats; and
the variable cargo surface is disposed in a rear cargo region behind the one or more rear occupant seats.

10. The vehicle of claim 5, wherein:
the vehicle includes one or more occupant seats comprising one or more front occupant seats and one or more rear occupant seats;
the one or more rear occupant seats have a front side, on which an occupant may sit when the one or more rear occupant seats are in a seating position, and a rear side, on which cargo may be stored when the one or more rear occupant seats are in a cargo position; and
the variable cargo surface is disposed on the rear side of one or more of the one or more rear occupant seats.

11. The vehicle of claim 5, wherein:
the vehicle further comprises one or more occupant seats disposed within the body; and
the variable cargo surface is disposed behind one or more of the one or more occupant seats.

* * * * *